United States Patent
Xu et al.

(10) Patent No.: US 10,595,234 B2
(45) Date of Patent: Mar. 17, 2020

(54) SUPPORT OF LEGACY NETWORK ELEMENTS IN SMALL CELL SYSTEM

(71) Applicant: Nokia Solutions and Networks Oy, Espoo (FI)

(72) Inventors: Xiang Xu, Jiangsu (CN); Srinivasan Selvaganapathy, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/770,192

(22) PCT Filed: Feb. 25, 2013

(86) PCT No.: PCT/CN2013/071833
§ 371 (c)(1),
(2) Date: Aug. 25, 2015

(87) PCT Pub. No.: WO2014/127541
PCT Pub. Date: Aug. 28, 2014

(65) Prior Publication Data
US 2016/0007235 A1   Jan. 7, 2016

(51) Int. Cl.
*H04W 36/00* (2009.01)
*H04W 8/26* (2009.01)
(Continued)

(52) U.S. Cl.
CPC .......... *H04W 36/0005* (2013.01); *H04W 8/26* (2013.01); *H04W 36/0072* (2013.01); *H04W 36/04* (2013.01); *H04W 84/045* (2013.01)

(58) Field of Classification Search
None
See application file for complete search history.

(56) References Cited

U.S. PATENT DOCUMENTS

2011/0243097 A1* 10/2011 Lindqvist .............. H04W 24/02
370/331
2012/0088505 A1* 4/2012 Toh ....................... H04W 8/186
455/434
(Continued)

FOREIGN PATENT DOCUMENTS

| CN | 101583175 A | 11/2009 |
| CN | 102111918 A | 6/2011 |
| WO | WO 2012/045370 A1 | 4/2012 |

OTHER PUBLICATIONS

3GPP TR 36.932 V12.0.0 (Dec. 2012); 3rd Generation Partnership Project; Technical Specification Group Radio Access Network; Scenarios and Requirements for Small Cell Enhancements for E-UTRA and E-UTRAN (Release 12).

*Primary Examiner* — Thinh D Tran
(74) *Attorney, Agent, or Firm* — Harrington & Smith (57) ABSTRACT

The present invention addresses apparatuses, methods and computer program product for enabling support of legacy user equipment and legacy network elements in small cell system for LTE and beyond systems. Each small cell uses a unique pair of Physical Cell Identifier and E-UTRAN Cell Global Identifier {PCI, ECGI} in the small cell system. In a handover preparation phase, when an enhanced eNB initiates the handover request procedure, the source eNB includes the pair of {PCI, ECGI} in the handover request message. Upon the reception of the {PCI, ECGI} from the handover request message, the associated eNB determines the target small cell based on the received pair of {PCI, ECGI}.

11 Claims, 9 Drawing Sheets

(51) Int. Cl.
 *H04W 36/04* (2009.01)
 *H04W 84/04* (2009.01)

(56) References Cited

U.S. PATENT DOCUMENTS

| | | | |
|---|---|---|---|
| 2012/0190368 A1* | 7/2012 | Zhang | H04W 36/0055 455/436 |
| 2013/0183971 A1* | 7/2013 | Tamaki | H04W 36/0061 455/436 |
| 2013/0190011 A1* | 7/2013 | Kim | H04W 64/00 455/456.1 |
| 2013/0215820 A1* | 8/2013 | Redana | H04W 16/26 370/315 |
| 2015/0148062 A1* | 5/2015 | Chen | H04W 60/00 455/456.1 |

* cited by examiner

Fig. 1 allocating a unique pair of physical cell identifier and E-UTRAN cell global identifier to one or each of a plurality of network elements, each forming a small cell and being associated with a specific base station — S11

SUPPORT OF LEGACY NETWORK ELEMENTS IN SMALL CELL SYSTEM

FIELD OF THE INVENTION

The present invention generally relates to wireless communication networks, and more specifically relates to a method, apparatus and computer program product for enabling support of legacy network elements in small cell system for LTE™ and beyond systems.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture.

According to this architecture, the use of small cells in addition to macro cells is being discussed, e.g. in 3GPP RAN for Release 12 (Rel-12). Such small cells have a more limited transmission range than macro cells. Thereby, two scenarios are considered. On the one hand, where a user equipment UE is in coverage of both the macro cell and the small cell simultaneously, and, on the other hand, where the UE is not in coverage of both the macro cell and the small cell simultaneously.

The scenario where small cell nodes are not deployed under the coverage of one or more overlaid E-UTRAN macro-cell layer(s) is also the target of the small cell enhancement considerations.

Additionally, the backward compatibility, i.e. the possibility for legacy (pre-Rel-12) UEs to access a small-cell node/carrier, is desirable for small cell deployments.

According to the specifications from 3GPP, it is required to support the legacy UE in the small cell system. In addition, the operator usually has already deployed large number of legacy (pre-Rel-12) eNBs for coverage purpose, when the operator plans to deploy small cell system for capacity enhancement.

Thus, it is required to support the mobility to small cell involving legacy UE/eNB (base station; evolved NodeB) for supporting a handover HO of an UE from a legacy eNB to a small cell, as well as a handover HO of a legacy UE from an enhanced eNB to a small cell.

However, there is no known method to support the mobility involving the pre-Rel-12 UE and pre-Rel-12 eNB.

SUMMARY OF THE INVENTION

Therefore, in order to overcome the drawbacks of the prior art, it is an object underlying the present invention to provide a way to support mobility involving legacy (pre-Rel-12) UE/eNB for LTE small cell.

In particular, it is an object of the present invention to provide a method, apparatus and computer program product for enabling support of legacy network elements in small cell system for LTE and beyond systems.

According to a first aspect of the present invention, there is provided a method, comprising allocating a unique pair of physical cell identifier and E-UTRAN cell global identifier to one or each of a plurality of network elements, each forming a small cell and being associated with a specific base station.

According to a second aspect of the present invention, there is provided an apparatus, which comprises processing means adapted to allocate a unique pair of physical cell identifier and E-UTRAN cell global identifier to one or each of a plurality of network elements, each forming a small cell and being associated with a specific base station.

According to further embodiments, each specific physical cell identifier or each specific E-UTRAN cell global identifier is shared by multiple of the plurality of network elements.

According to further embodiments, the E-UTRAN cell global identifier is related to the associated base station.

According to a third aspect of the present invention, there is provided a method, comprising causing transmission of a preset pair of physical cell identifier and E-UTRAN cell global identifier to an associated base station, receiving indication for reserving radio resources for accepting an inbound handover of an E-UTRAN user equipment, reserving a set of radio resources per the indication for accepting an inbound handover of an E-UTRAN user equipment, and informing the associated base station about the reserved set of radio resources.

According to a fourth aspect of the present invention, there is provided an apparatus, which comprises transmission means adapted to transmit a preset pair of physical cell identifier and E-UTRAN cell global identifier to an associated base station, reception means adapted to receive indication for reserving radio resources for accepting an inbound handover of an E-UTRAN user equipment, reservation means adapted to reserve a set of radio resources per the indication for accepting an inbound handover of an E-UTRAN user equipment, and informing means adapted to inform the associated base station about the reserved set of radio resources.

According to further embodiments, in case neighboring with a legacy E-UTRAN base station, using the same physical cell identifier space reserved for home evolved Node B(s).

According to a fifth aspect of the present invention, there is provided a method, comprising receiving a handover request message or handover required message from a source base station which initiates a handover request procedure, the handover request message or handover required message comprises a pair of physical cell identifier and E-UTRAN cell global identifier, determining an associated target network element forming a small cell based on the received pair of physical cell identifier and E-UTRAN cell global identifier, and causing transmission of handover information to the determined network element.

According to a sixth aspect of the present invention, there is provided an apparatus, which comprises reception means adapted to receive a handover request message or handover required message from a source base station which initiates a handover request procedure, the handover request message or handover required message comprises a pair of physical cell identifier and E-UTRAN cell global identifier, determination means adapted to determine an associated target network element forming a small cell based on the received pair of physical cell identifier and E-UTRAN cell global identifier, and transmission means adapted to cause transmission of handover information to the determined network element.

According to certain embodiments, the physical cell identifier information is included as a new Information Element or included in the Radio Resource Control context in the handover request message and handover required message.

According to further embodiments, in case the source base station only provides the E-UTRAN cell global identifier information in the handover request message, or handover required message, performing distributing resource allocation information to candidate target network elements sharing the same E-UTRAN cell global identifier.

According to certain embodiments, determining the target network element is based on the combination of E-UTRAN cell global identifier of the source network element with the E-UTRAN cell global identifier of the target network element.

According to other embodiments of the invention, in case plural network elements are prepared during the handover, initiating a handover cancel procedure to inform the non-target network elements to free the pre-allocated resource.

According to a seventh aspect of the present invention, there is provided a computer program product comprising computer-executable components which, when the program is run, are configured to carry out the method according to the first, third or fifth aspect.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Generally, the present invention enables to support mobility involving legacy UE/eNB in small cell system.

According to certain embodiments of the present invention, each small cell uses a unique pair of Physical Cell Identifier and E-UTRAN Cell Global Identifier {PCI, ECGI} in the small cell system. The small cell's ECGI is related to the associated eNB, e.g., left 20 bits same as the eNB ID of associated eNB. A specific PCI or ECGI may be shared by multiple small cells.

The small cells may use the same PCI space as the Home-eNB (HeNB) when the direct neighbor of the small cell is legacy eNB(s).

Further, according to certain embodiments, the small cell informs the associated eNB about its {PCI, ECGI}.

The small cells under the same associated eNB are preconfigured to reserve a set of radio resource only for accepting inbound HO related to legacy UE.

As regards the handover preparation phase, when an enhanced eNB initiates the handover request procedure, the source eNB includes the pair of {PCI, ECGI} in the handover request message (HO Req msg). The PCI information may be added as a new Information Element, or may also be included in the radio resource control RRC Container/Context.

Thereby, upon the reception of the {PCI, ECGI} from the HO Req msg, the associated eNB determines the target small cell based on the received pair of {PCI, ECGI}. In case the source eNB only provides the ECGI of target small cell, the associated eNB performs resource allocation instead of the small cell, and distributes the resource allocation information to candidate small cells sharing the same ECGI. The candidate small cells follow the instruction from the Associated eNB when accept the HO Req.

Furthermore, as regards the HO completion phase, the target small cell initiates the RRC connection reconfiguration procedure to free the radio resource reserved for inbound HO related to legacy UE.

Thereby, the target small cell informs the associated eNB (A-eNB) that the dedicated radio resource is available for accept new inbound HO related to other legacy UE. In case several small cells are prepared during the HO, the A-eNB initiates the HO cancel procedure to inform the non-target small cell to free the pre-allocated resource after the UE connects to target small cell.

In general, a small cell is formed by a network element, such as an access point AP.

Figure 1:
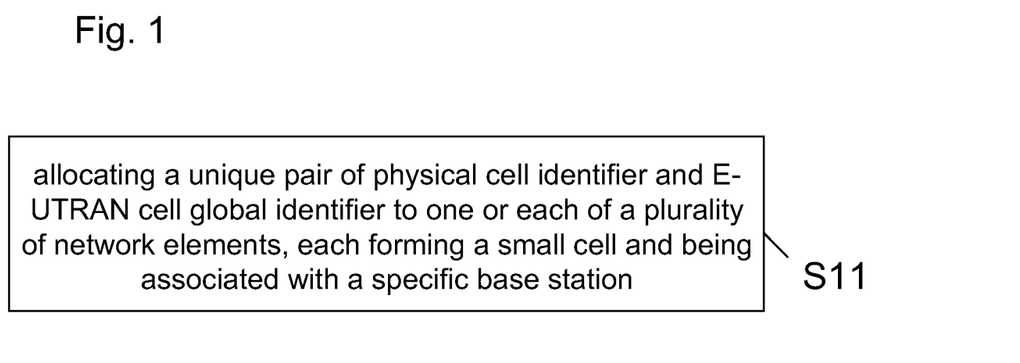
FIG. 1 illustrates a method according to certain embodiments of the invention.

FIG. 1 shows a principle flowchart of an example for a method according to certain embodiments of the present invention.

In Step S11, a pair of physical cell identifier and E-UTRAN cell global identifier is allocated to a network element forming a small cell and being associated with a specific base station.

Figure 2:
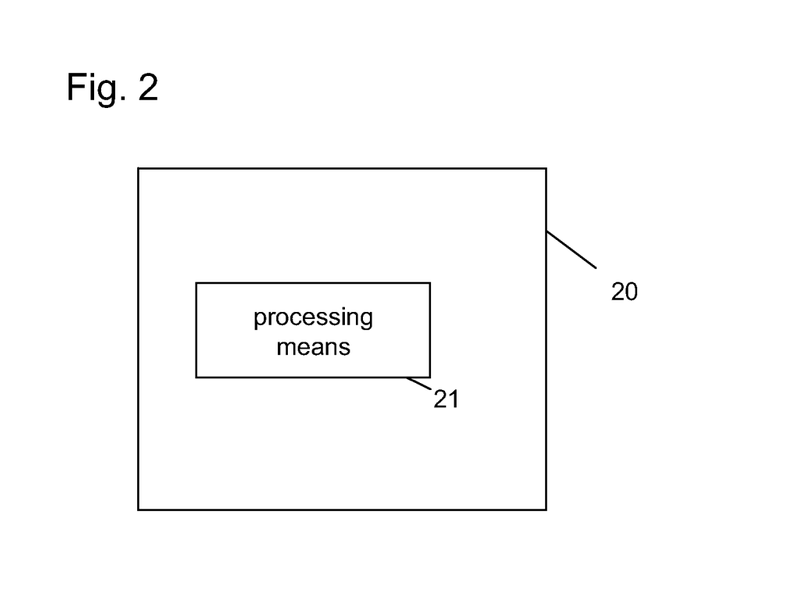
FIG. 2 schematically illustrates an apparatus according to certain embodiments of the invention.

FIG. 2 shows a principle configuration of an example for an apparatus according to certain embodiments of the present invention. The apparatus 20 comprises a processing means 21 adapted to allocate a pair of physical cell identifier and E-UTRAN cell global identifier to a network element forming a small cell and being associated with a specific base station.

Figure 3:
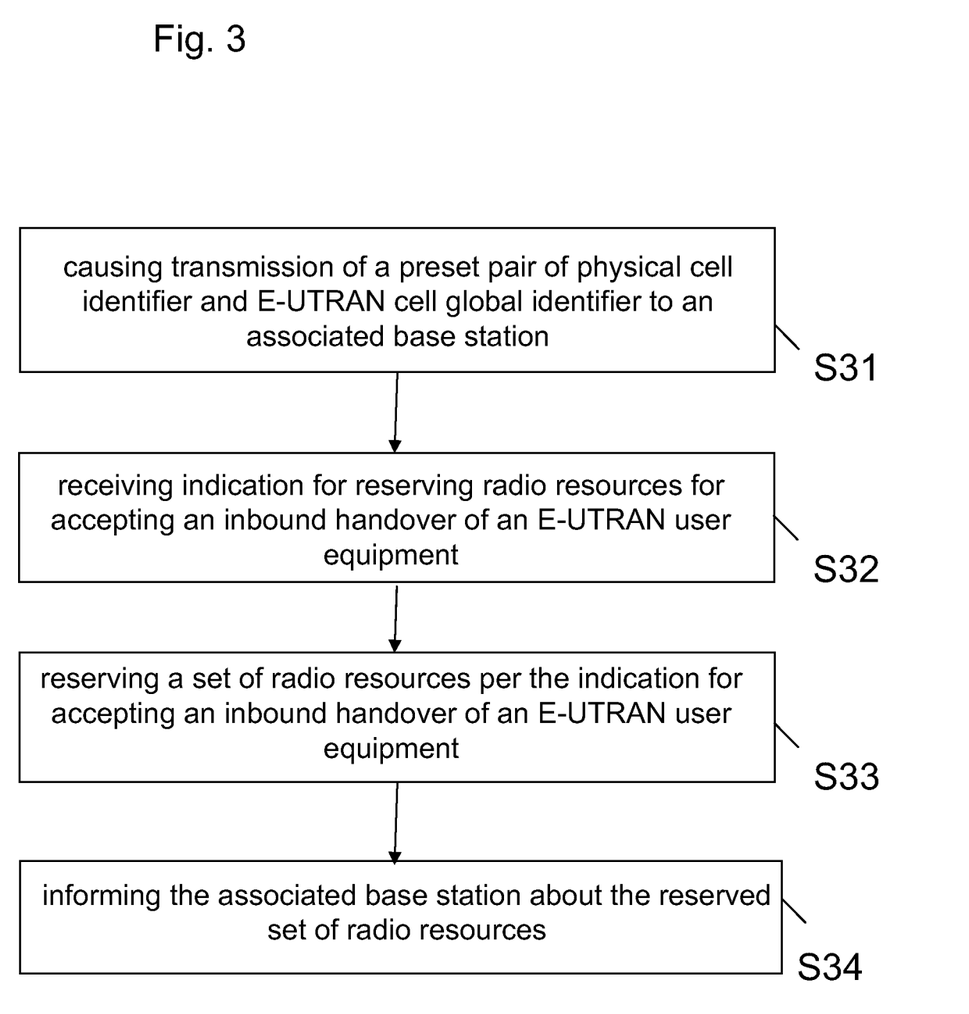
FIG. 3 illustrates a method according to certain embodiments of the invention.

FIG. 3 shows a principle flowchart of an example for a method according to certain embodiments of the present invention.

In Step S31, transmission of a preset pair of physical cell identifier and E-UTRAN cell global identifier to an associated base station is caused.

In Step S32, indication for reserving radio resources for accepting an inbound handover of an E-UTRAN user equipment is received.

In Step S33, a set of radio resources per the indication for accepting an inbound handover of an E-UTRAN user equipment is reserved.

In Step S34, the User Equipment is informed about the reserved set of radio resources.

Figure 4:
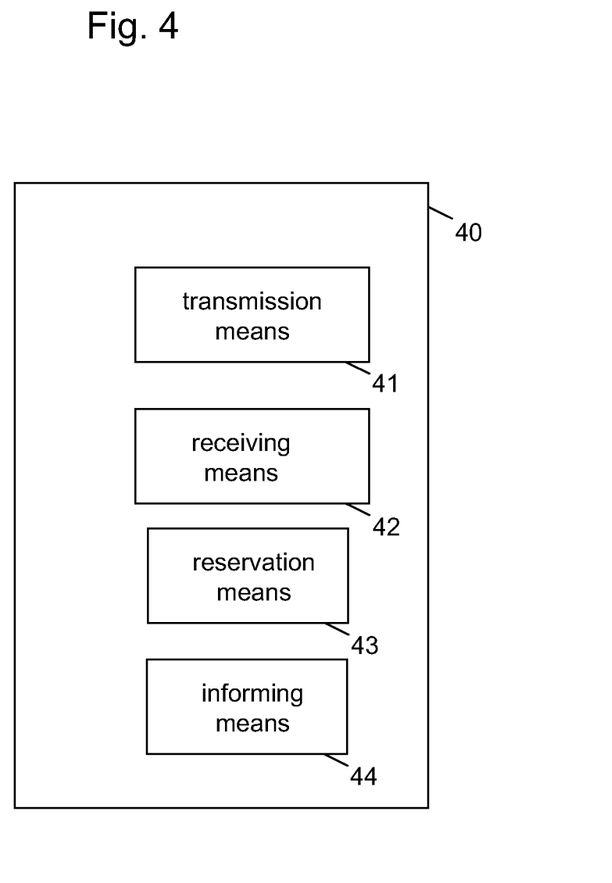
FIG. 4 schematically illustrates an apparatus according to certain embodiments of the invention.

FIG. 4 shows a principle configuration of an example for an apparatus according to certain embodiments of the present invention. The apparatus 40 comprises a transmission means 41 adapted to transmit a preset pair of physical cell identifier and E-UTRAN cell global identifier to an associated base station, a reception means 42 adapted to receive indication for reserving radio resources for accepting an inbound handover of an E-UTRAN user equipment, a reservation means 43 adapted to reserve a set of radio resources per the indication for accepting an inbound handover of an E-UTRAN user equipment, and a informing means 44 adapted to inform the associated base station about the reserved set of radio resources.

Figure 5:
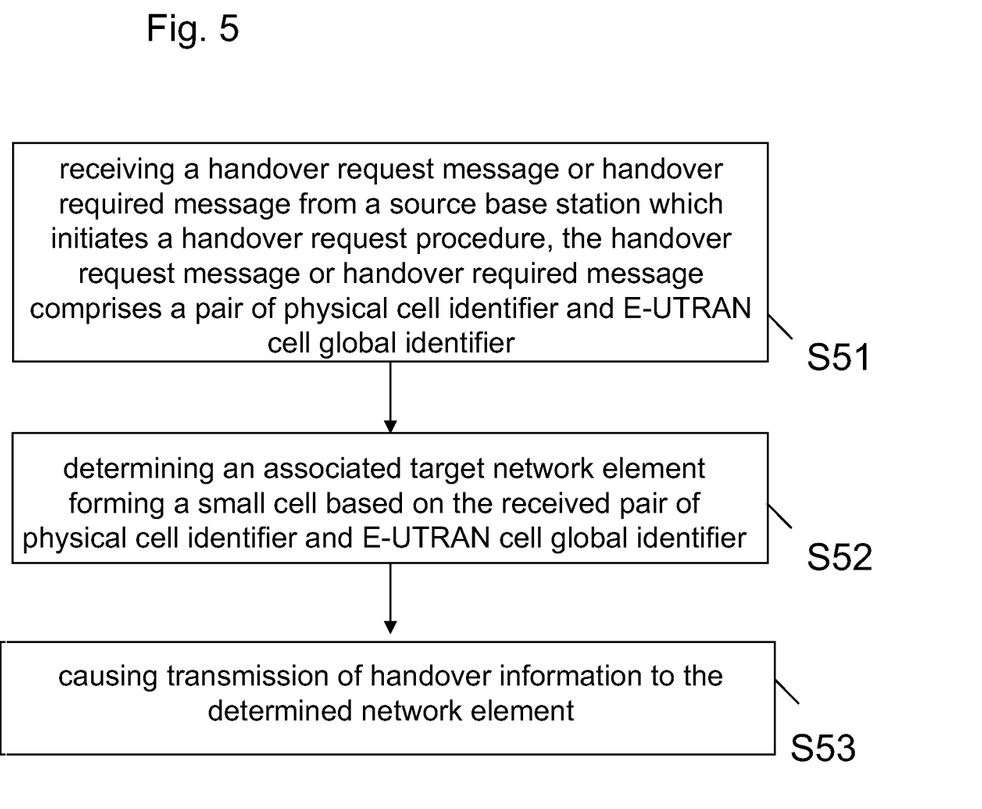
FIG. 5 illustrates a method according to certain embodiments of the invention.

FIG. 5 shows a principle flowchart of an example for a method according to certain embodiments of the present invention.

In Step S51, a handover request message or handover required message is received from a source base station which initiates a handover request procedure, the handover request message or handover required message comprises a pair of physical cell identifier and E-UTRAN cell global identifier.

In Step S52, an associated target network element forming a small cell is determined based on the received pair of physical cell identifier and E-UTRAN cell global identifier.

In Step S53, transmission of handover information to the determined network element is caused.

Figure 6:
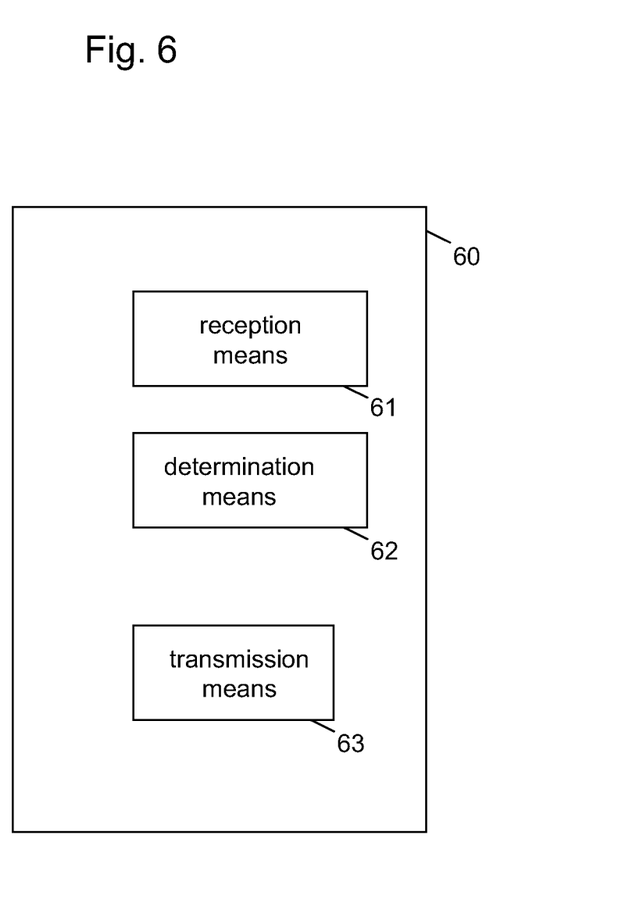
FIG. 6 schematically illustrates an apparatus according to certain embodiments of the invention.

FIG. 6 shows a principle configuration of an example for an apparatus according to certain embodiments of the present invention. The apparatus 60 comprises a reception means 61 adapted to receive a handover request message or handover required message from a source base station which initiates a handover request procedure, the handover request message or handover required message comprises a pair of physical cell identifier and E-UTRAN cell global identifier, a determination means 62 adapted to determine an associated target network element forming a small cell based on the received pair of physical cell identifier and E-UTRAN cell global identifier, and a transmission means adapted to cause transmission of handover information to the determined network element.

The present invention provides the following advantages:
Maximizing the reuse of current LTE HO procedure
Less changes to the small cell system
Avoid changes to S1 interface, S11 interface and mobile management entity MME In the following, implementations according to certain embodiments of the present inventions are described. In FIGS. 3 to 6, bold letters indicate specific features according to the present invention. In the implementations according to certain embodiments of the present invention as described below, it is assumed that the UE is a legacy UE, but the implementations may also be used for a Rel-12 UE.

Figure 7:
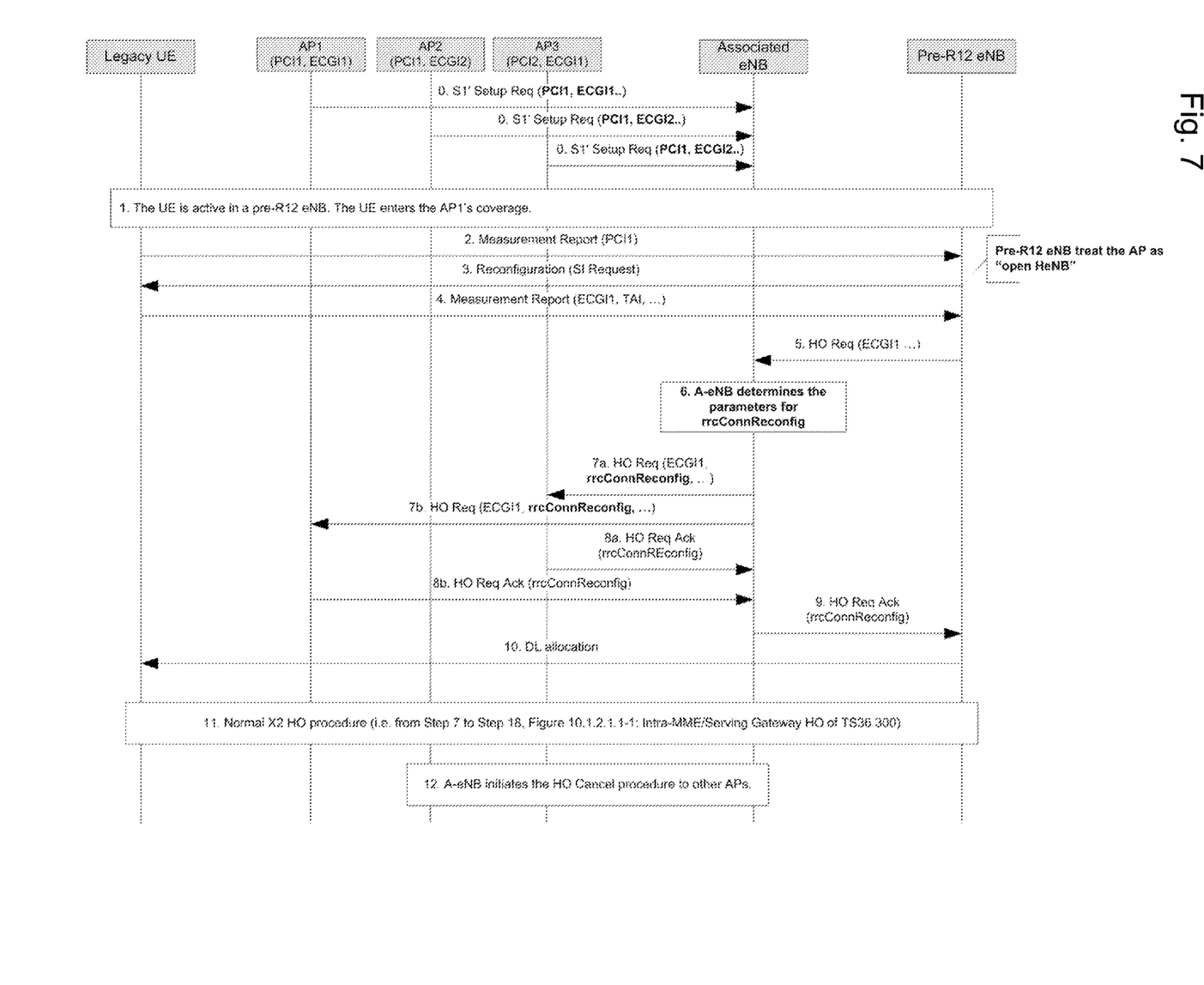
FIG. 7 describes an implementation according to certain embodiments of handover HO a UE from a pre-Rel-12 eNB to an access point AP.

FIG. 7 describes an implementation of HO a UE from a pre-Rel-12 eNB to an access point AP according to certain embodiments of the present invention.

In Step 0, at operation, administration, and maintenance OAM, the pair of identifiers {PCI, ECGI} is assigned to an AP. The 20-leftmost bit of the ECGI is the same as the associated eNB's ID. The APs may share the same ECGI or PCI, but OAM ensures the pair of {PCI, ECGI} used by each AP is unique in the small cell system. For example, AP1 and AP3 may share the same ECGI. AP1 and AP2 may share the same PCI. When the AP initiates the S1' setup with the associated eNB, the AP informs the A-eNB about its {PCI, ECGI}. The APs use the PCIs pre-allocated for open HeNB. The pre-Rel-12 eNB is preconfigured with the PCIs of the open HeNBs. So the pre-Rel-12 eNB treat the small cell as a kind of "open HeNB".

Thereby it is to be noted that this is different to current S1 Setup Req, that only reports the eNB ID, rather than the ECGI/PCI.

In Step 1, the legacy UE is active in a pre-Rel-12 eNB, then the UE enters the coverage of the AP.

In Step 2, the UE sends the measurement report including the measurement information of AP.

In Step 3, the Pre-Rel-12 eNB treats the target as open HeNB based on its PCI. The Pre-Rel-12 eNB asks the UE to provide the system information SI.

In Step 4, the UE sends the SI to the pre-Rel-12 eNB.

In Step 5, the Pre-Rel-12 eNB initiates the handover HO, including the target's ECGI, i.e. ECGI1. In case of S1 HO, the HO msg is routed via the MME.

In Step 6, based on the information received in S1' Setup procedure, the A-eNB can know whether the HO Req msg only need to be forward to target AP in case the target's ECGI is unique, or forward it to multiple candidate APs in case they share the same ECGI, e.g. ECGI1 is shared by AP1 and AP3. In the later case, the A-eNB determines the radio resource to be used in all candidate APs so that all candidate APs send back the same RRCContext IE in the HO Req Ack msg.

Thereby it is to be noted that this is different to current strategies that A-eNB only allocates the radio resource for a specific AP in case the RRC is terminated at the A-eNB. According to certain embodiments of the present invention, the A-eNB always allocates the radio resource for all candidate APs no matter whether the RRC is terminated at the A-eNB or at the AP. This proposal assumes the associated eNB knows the real-time radio resource usage in all APs.

In Step 7, the A-eNB forwards the HO Req to all candidate APs who share ECGI1. The HO Req msg includes the radio resource allocation information.

In Step 8, the candidate AP accepts the HO Req, and allocates resource according to the information received from A-eNB.

Step 9-11 are the same as known X2 HO procedure. In case of S1 HO, the HO msg is routed via the MME.

In Step 12, after the UE connects to the target AP, the A-eNB initiates HO Cancel procedure to other candidate APs to free the resources allocated in Step 8.

Figure 8:
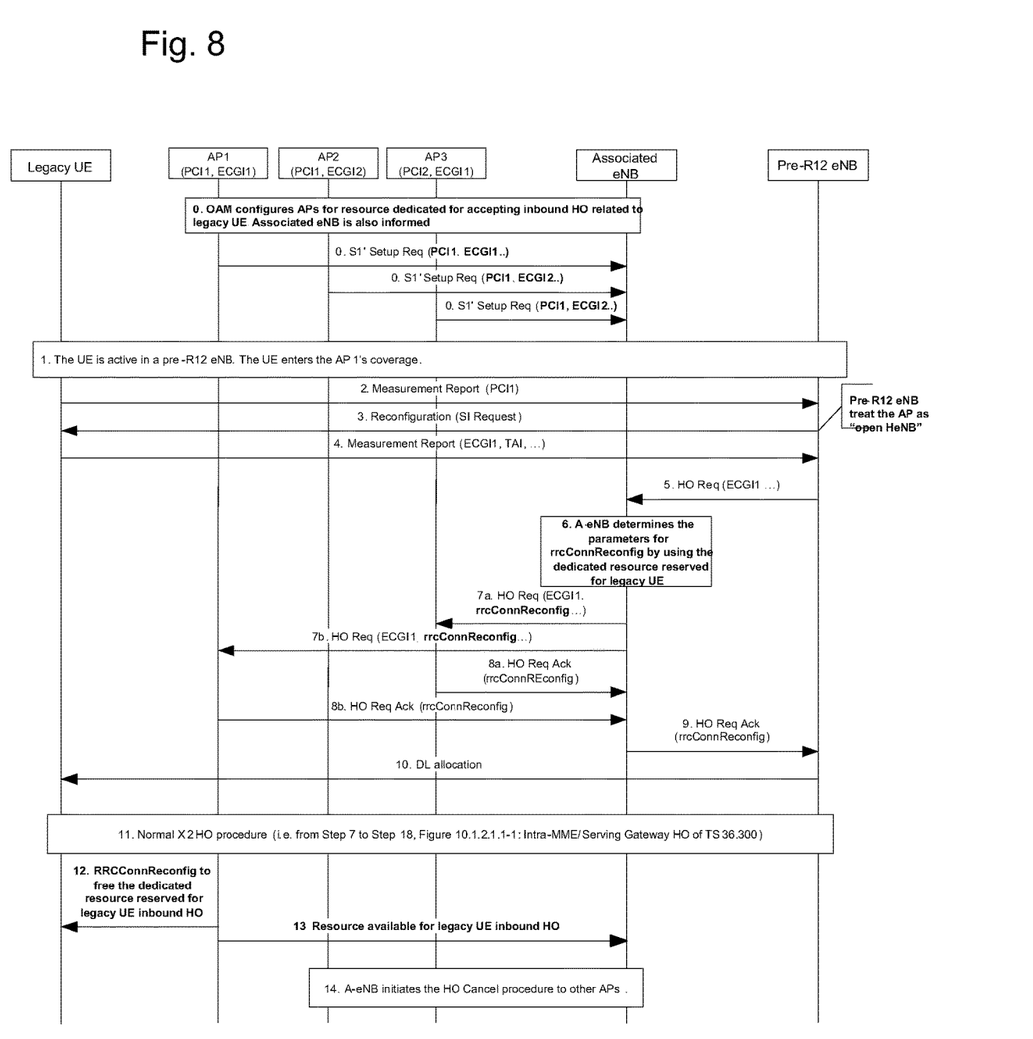
FIG. 8 describes another implementation according to certain embodiments of HO a UE from a pre-Rel-12 eNB to an AP.

FIG. 8 describes another implementation of HO a UE from a pre-Rel-12 eNB to an AP according to certain embodiments of the present invention. In this example, the associated eNB cannot dynamically determine the radio resources in APs for the UE. This may be because the AP uses non-ideal backhaul and cannot provide the real-time radio resource usage information to the associated eNB.

Detailed description of steps identical to the above mentioned steps have been omitted.

In Step 0, OAM configures APs for radio resource dedicated for accepting the inbound HO related to legacy UE. This type of radio resource is only used during the inbound HO related to legacy UE. The Associated eNB is also informed about the radio resource reserved in APs.

In Step 6, the associated eNB determines the parameters for RRCConnREconfiguration based on the radio resources reserved in APs.

In Step 12, after the UE connects to AP1, AP1 initiates RRCConnReconfigure procedure to free the radio resource reserved for inbound HO related to legacy UE, so the reserved radio resource can be used to accept the inbound HO for other legacy UEs.

In Step 13, AP1 informs the associated eNB that the reserved resource is now available to accept the inbound HO for other legacy UE.

Figure 9:
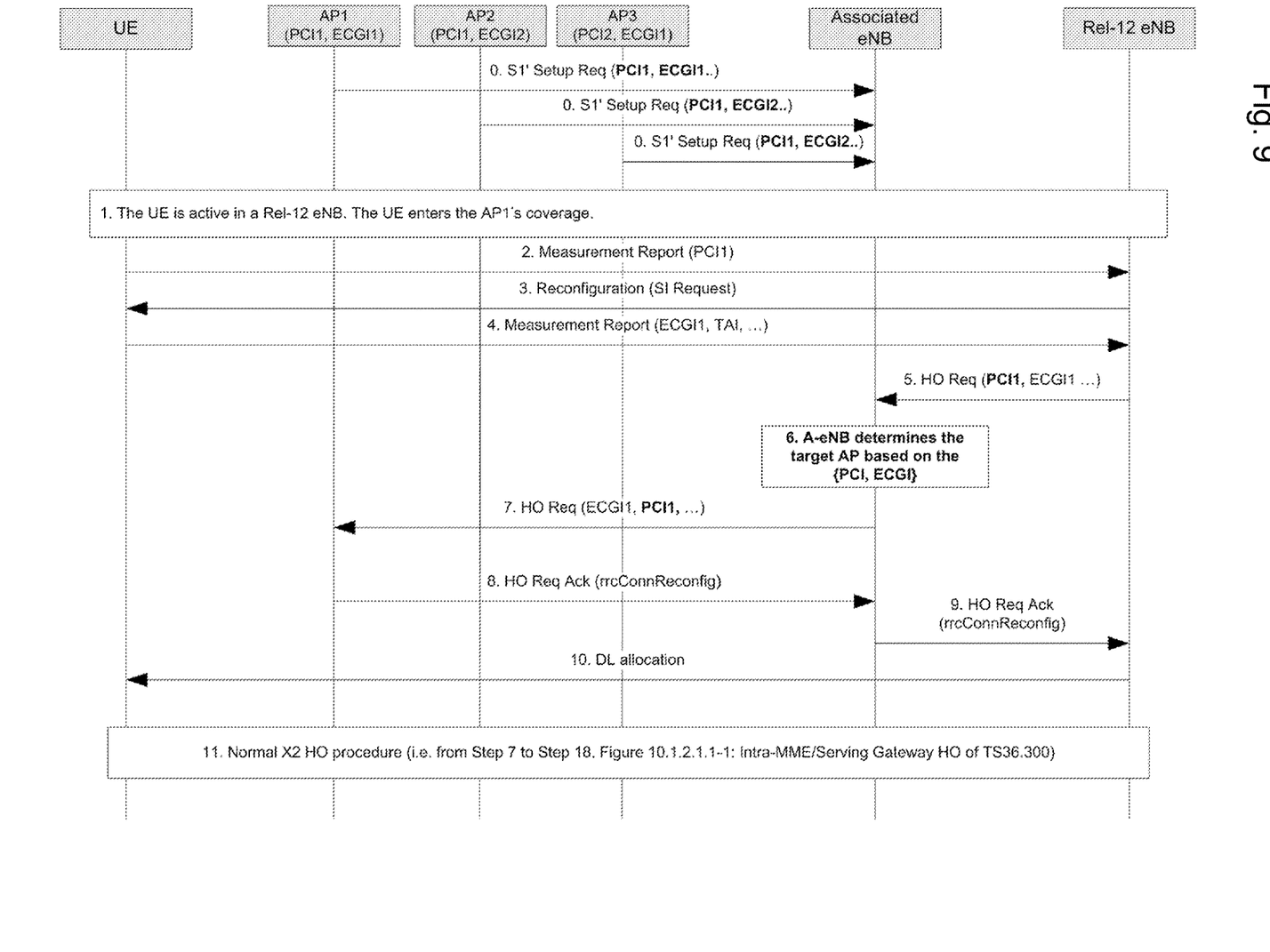
FIG. 9 describes an implementation according to certain embodiments of HO a UE from an enhanced eNB to an AP.

FIG. 9 describes an implementation of HO a UE from an enhanced eNB to an AP according to certain embodiments of the present invention. The enhanced eNB can send an enhanced HO Req msg including the target's PCI.

The major difference to FIG. 7 is that the enhanced eNB can include the additional information, i.e. the {PCI, ECGI} in the HO Req msg (Step 5). There are other differences shown as below.

In Step 0, the AP may not need to use the PCIs reserved for open HeNB.

In Step 3, the enhanced eNB know the target is AP, and ask the UE to report the SI.

In Step 5, the enhanced eNB initiates the HO procedure. The HO Req msg includes the target AP's PCI. The PCI information may be included as a new IE in the HO Req msg, or as a new IE in the RRC Container/Context.

In Step 6, based on the received {PCI, ECGI} and the previous stored information, the A-eNB can determine the target AP. The A-eNB may or may not allocate the radio resource allocation dependent on whether the RRC is terminated at the A-eNB or at the AP.

In Step 7, the A-eNB send the HO Req msg including the {PCI, ECGI} to target AP.

Figure 10:
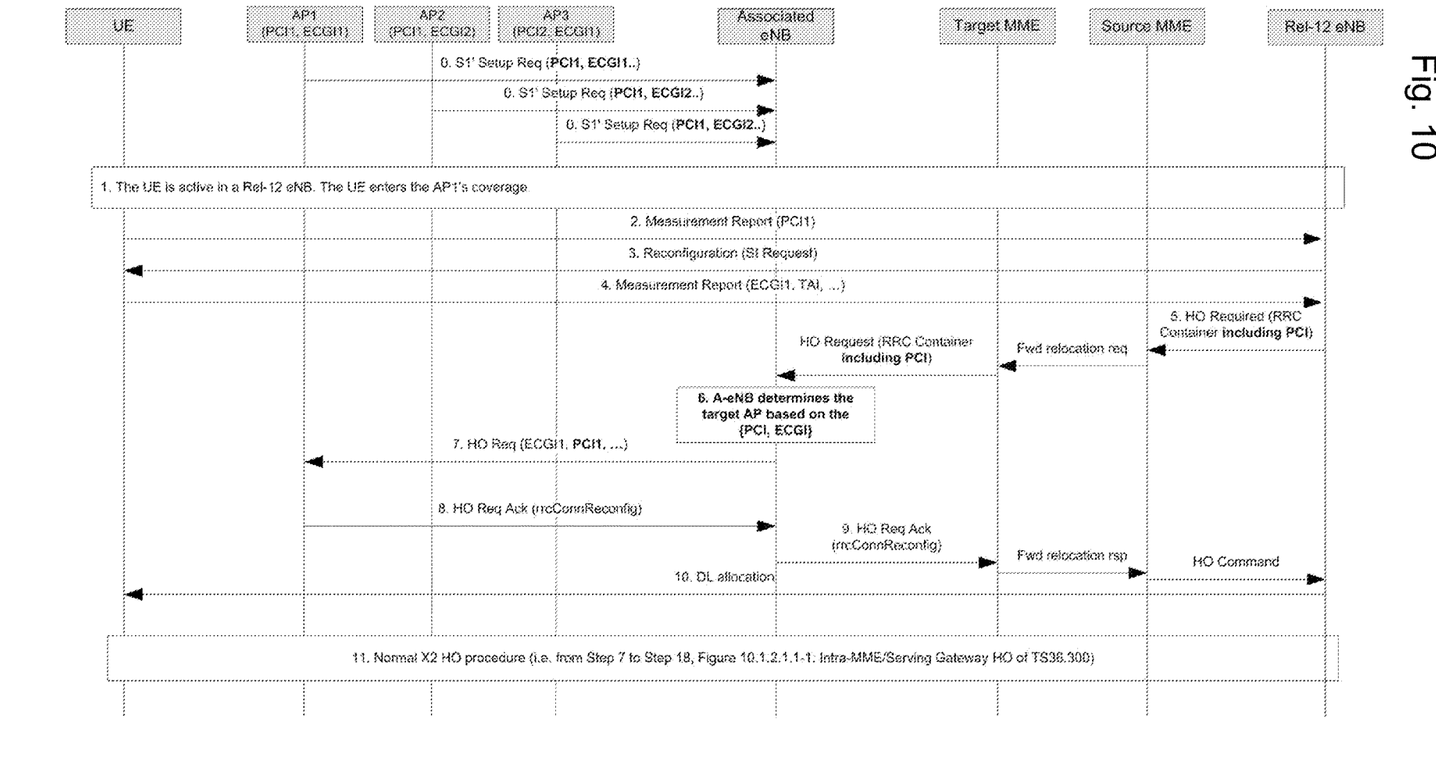
FIG. 10 describes an implementation according to certain embodiments of S1 HO a UE from an enhanced eNB to an AP.

FIG. 10 describes an implementation of S1 HO a UE from an enhanced eNB to an AP according to certain embodiments of the present invention.

In Step 5, the source eNB sends the handover required message including the additional information, i.e. the PCI, in the RRC Container, which is transparent to the MME. The MME simply forward the enhanced RRC Container to target MME via Forward Relocation Request message. Target MME send the RRC container to target eNB via handover request message. This avoids the changes to S1 msg, S11 msg and MME.

There are further non-limiting variations possible for the solution provided by the present invention. In these variations, some information other than the pair of {PCI, ECGI} is used to identify the target AP.

According to Variation 1, Target AP Identification is based on the combination of source ECGI and target ECGI.

In particular, if OAM can allocate ECGI based on macro-coverage and ensures that ECGIs are reused across different macro-coverage, and uniqueness within macro-ECGI coverage is maintained, the target AP can be identified based on the combination of macro-cell ECGI and target-cell ECGI. This will result in unique target ECGI in most of the cases, so the chances of associated eNB sending HO-Request to multiple target small cells can be avoided.

In the above scenario, the enhanced eNB will include the source ECGI of the UE in UE-history information in the HO preparation messages. A-eNB will use this info along with target-ECGI to find out the unique small-cell connecting to it.

This solution is applicable only in case the small-cells are deployed under macro-coverage, and small cells report the surrounding macro-ECGI info to OAM.

Variation 2 provides reduction of bits for eNB-ID within ECGI. In particular, according to Variation 2 it is possible to allocate more bits of the 28-bit ECGI for the Small Cell. In this case, the macro-eNB can map multiple 20-bit eNB-IDs against single eNB IP Address. Here Associated-eNB can send the eNB-ID with only the first X bits filled.

Similar understanding can be used in MME-Configuration transfers also, so that right TNL address is given for the ECGI values of A-eNB. Here uniqueness of ECGI across network is maintained with larger APs per eNB possible.

In the following, a table showing Global eNB ID according to certain embodiments of the present invention is shown.

| >Macro eNB ID | | | |
|---|---|---|---|
| >>Macro eNB ID | M | BIT STRING (20) | Equal to the 20 leftmost bits of the Cell Identity IE contained in the E-UTRAN CGI IE (see subclause 9.2.1.38) of each cell served by the eNB. |
| ≻A-eNB ID | | BIT STRING (20) | For A-eNB only X bits of 20 bits will be filled. Remaining will be set to 0. This indicates that the eNB have more than 256 cells. For identification of A-eNB, MME will use only leftmost X bits of 20 bit eNB-ID it receives from macro-eNB. |

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE™ or LTE-Advanced, and can advantageously be implemented also in controllers, base stations, user equipments or smart phones, or personal computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
A-eNB Associated eNB
ECGI E-UTRAN cell global identifier
eNB Base station
E-UTRAN Enhanced UTRAN
HO Handover
LTE Long Term Evolution
MME Mobility Management Entity
RAN Radio Access Network
RRC Radio Resource Control
OAM Operation, Administration and Maintenance
PCI Physical cell identifier
UE User Equipment
UL Uplink
UTRAN UMTS Terrestrial Radio Access Network
Uu Interface between UE and eNB

What is claimed is:

1. A method comprising:
receiving, at a non-legacy (Rel 12) base station associated with one or more access points, each of said one or more access points forming a small cell under the base station, a unique pair of a physical cell identifier and an E-UTRAN cell global identifier {PCI, ECGI} for each of said one or more access points, wherein the E-UTRAN cell global identifier (ECGI) is related to the identity (ID) of the base station, and wherein the base station allocates radio resources for all of the one or more access points, each unique pair being provided by operation, administration, and maintenance (OAM) to uniquely identify each of said one or more access points;
receiving, at the base station, one of a handover request message and a handover required message from a source base station, said source base station thereby initiating a handover request procedure for a legacy (pre-Rel 12) user equipment (UE) entering a coverage area of one of the access points, said source base station being a legacy (pre-Rel 12) base station, the one of a handover request message and a handover required message including the unique pair of a physical cell identifier and an E-UTRAN cell global identifier {PCI, ECGI} for said one of said one or more access points associated with the base station;
determining, by the base station, the access point identified by the unique pair, said access point being a determined target network element for a handover;
transmitting the one of a handover request message and a handover required message to the determined target network element;
receiving an acknowledgement of the one of a handover request message and a handover required message from the determined target network element; and
transmitting the acknowledgement of the one of a handover request message and a handover required message from the determined target network element to the source base station.

2. The method according to claim 1, wherein the physical cell identifier is included as a new Information Element, or is included in a radio resource control context in the one of a handover request message and a handover required message.

3. The method according to claim 1, further comprising, in case the source base station only provides the E-UTRAN cell global identifier in the one of a handover request message and a handover required message, distributing resource allocation information to candidate access points sharing the same E-UTRAN cell global identifier.

4. The method according to claim 1, wherein determining the access point is based on a combination of an E-UTRAN cell global identifier of the source base station with the E-UTRAN cell global identifier of the access point.

5. The method according to claim 1, further comprising, in case a plurality of potential target network elements are prepared during the handover procedure, initiating a handover cancel procedure to inform non-target network elements to free a pre-allocated resource.

6. A computer program product comprising a non-transitory computer-readable storage medium bearing computer program code embodied therein for use with a computer, the computer program code comprising code for performing the method according to claim 1.

7. An apparatus comprising:
at least one processor; and
at least one memory including computer program code, the at least one memory and the computer program code configured, with the at least one processor, to cause the apparatus to perform the following:
receive, at the apparatus, said apparatus being associated with one or more access points, each of said one or more access points forming a small cell under the apparatus, a unique pair of a physical cell identifier and an E-UTRAN cell global identifier {PCI, ECGI} for each of said one or more access points, wherein the E-UTRAN cell global identifier (ECGI) is related to the identity (ID) of the apparatus, and wherein the apparatus allocates radio resources for all of the one or more access points, each unique pair being provided by operation, administration, and maintenance (OAM) to uniquely identify each of said one or more access points;

receive, at the apparatus, one of a handover request message and a handover required message from a source base station, said source base station thereby initiating a handover request procedure for a legacy (pre-Rel 12) user equipment (UE) entering a coverage area of one of the access points, said source base station being a legacy (pre-Rel 12) base station, the one of a handover request message and a handover required message including the unique pair of a physical cell identifier and an E-UTRAN cell global identifier {PCI, ECGI} for said one of said one or more access points associated with the apparatus;

determine, by the apparatus, the access point identified by the unique pair, said access point being a determined target network element for a handover;

transmit the one of a handover request message and a handover required message to the determined target network element;

receive an acknowledgement of the one of a handover request message and a handover required message from the determined target network element; and transmit the acknowledgement of the one of a handover request message and a handover required message from the determined target network element to the source base station, wherein said apparatus is a non-legacy (Rel 12) base station.

8. The apparatus according to claim 7, wherein the physical cell identifier is included as a new Information Element, or is included in a radio resource control context in the one of a handover request message and a handover required message.

9. The apparatus according to claim 7, wherein the at least one memory and the computer program code are further configured, with the at least one processor, in case the source base station only provides the E-UTRAN cell global identifier in the one of a handover request message and a handover required message, to distribute resource allocation information to candidate access points sharing the same E-UTRAN cell global identifier.

10. The apparatus according to claim 7, wherein determine the access point is based on a combination of an E-UTRAN cell global identifier of the source base station with the E-UTRAN cell global identifier of the access point.

11. The apparatus according to claim 7, wherein the at least one memory and the computer program code are further configured, with the at least one processor, in case a plurality of potential target network elements are prepared during the handover procedure, to initiate a handover cancel procedure to inform non-target network elements to free a pre-allocated resource.

* * * * *